Patented July 1, 1947

2,423,284

UNITED STATES PATENT OFFICE 2,423,284

INSECTICIDES

Francisco E. Babbini, Lima, Peru

No Drawing. Application July 17, 1945, Serial No. 605,625. In Peru February 2, 1943

5 Claims. (Cl. 167—24)

The present invention is in part a continuation of copending application Ser. No. 476,849, filed February 23, 1943.

This invention relates to insecticidal compositions, and more especially to those compositions which contain toxic ingredients of vegetable origin as essential insecticidal agents. The invention is concerned more particularly with insecticidal compositions of the type which include capsicum (capsicine), and veratrine and methyl crotonic acid in the form of sabadilla seed (Schoenocaulon officinale) as active ingredients.

A primary object of the invention is the embodiment of new insecticidal compositions containing the aforesaid active ingredients but which are more efficient than similar products hitherto employed.

A further object of the invention is the development of compositions of the above-indicated character, particularly useful for the extermination of Dysdercus, aphis, anthonomus, worms and other pests which attack cotton plants and other crops.

It has been found that the objects of the invention can be realized by incorporating lime, preferably in the form of carbonate, sulfate or hydrate, into an insecticidal composition containing the aforementioned capsicum and sabadilla seed. It has been found that the lime, in the aforesaid form, acts as a synergist in admixture with capsicum and sabadilla seed and so enhances the respective insecticidal potencies of these substances that the insecticidal activity of the resultant mixture is far greater than the sum of the individual insecticidal activities of the several ingredients.

It has also been found that the further admixture, with the aforesaid capsicum, sabadilla seed and lime, of an arsenical complement such as arsenate of lime, further enlarges the range of the lethal effect of the resultant insecticidal composition.

The products according to the invention, characterized as aforesaid by their content, in intimate mutual admixture, of capsicum, sabadilla seed and lime with or without the complementary arsenical, is preferably used in finely divided powder form, but may also be used in the form of a solution, e. g., as a spray.

The invention thus provides a multiple action insecticide, the lethal effect of which may be realized by contact, by asphyxiation and/or by ingestion. The lethal action of the insecticides according to the invention is particularly useful against Dysdercus, a pest which has heretofore escaped effective control.

An important characteristic of the products of this invention is the lasting toxic effect thereof, it having been demonstrated that the insecticidal activity thereof persists for as long as 144 hours or more after application.

Because of the above-described characteristics, the result of the invention is in effect to make available a greater amount of insecticide from a smaller quantity of raw material, which is manifestly of economic advantage.

A further advantage of the invention resides in the fact that the sabadilla seed and capsicum may be used essentially in their natural state, i. e., without the necessity of chemical pretreatment. The sabadilla (Schoenocaulon officinale) provides the insecticidal veratrine and methyl crotonic acid. The capsicum (capsicine) is used in the form of the natural capsicum pods.

The method of manufacture of the compositions according to the invention is of utmost simplicity. The vegetable ingredients are taken directly in raw natural state and after reduction to pulverulent state are admixed with the lime compound and/or arsenical. The proportions of the ingredients are variable in accordance with the toxic potency desired to be imparted to the insecticide. A practical range of ingredients is, for example, as follows:

| | Parts by weight |
|---|---|
| Sabadilla seed | 25 to 13.34 |
| Capsicum | 15 to 10.00 |
| Lime compound | 30 to 43.33 |
| Arsenical | 30 to 33.33 |

While calcium arsenate (arsenate of lime) has been mentioned as the preferred arsenical, other insecticidal arsenic compounds, such as lead arsenate and the like, may also be employed.

The synergistic or activating effect of the lime is demonstrated, for example, by the following comparative test made with regard to the preparation of Example 1, below, using Dysdercus as test insects. In each test, 20 insects were dusted under otherwise equal conditions with 3 grams of the test preparations. The following table shows the results:

| Preparation | Dead Insects | Surviving Insects | Time, Minutes |
|---|---|---|---|
| Powdered capsicum alone | 12 | 8 | 120 |
| Powdered capsicum (2 parts) with powdered lime hydrate (1 part) | 16 | 4 | 90 |
| Powdered sabadilla seed alone | 10 | 10 | 60 |
| Powdered sabadilla seed (15 parts) with powdered capsicum (15 parts) | 20 | 0 | 15 |
| Preparation of Example 1 (using lime hydrate) | 20 | 0 | 5 |

It will be understood, of course, that the preferred ingredients according to the present invention may be admixed, if desired, with any suitable and desirable quantity of other insecticidal material, such as rotenone or the like, and with any suitable and desirable quantity of inert additament, such as talc or the like. The use of these added materials is, however, not at all a prerequisite of the invention.

Following are presently-preferred and illustrative embodiments of the invention:

*Example 1*

15 parts by weight of sabadilla seed (*Schoenocaulon officinale*), 15 parts by weight of capsicum pods and 70 parts by weight of lime (in the form of the carbonate, sulfate or hydrate) are mixed together. The sabadilla seed and the capsicum pods may be pulverized in a suitable grinder until an impalpable powder is produced; this is then mixed with the lime compound, the resultant mixture being mechanically agitated until a uniform product results, which can be applied forthwith for insecticidal purposes.

*Example 2*

25 parts by weight of sabadilla seed (*Schoenocaulon officinale*), 15 parts by weight of capsicum pods, 30 parts by weight of lime (in the form of the carbonate, sulfate or hydrate), and 30 parts by weight of arsenate of lime are mixed together in the manner described in Example 1. The resultant material is an excellent insecticidal dusting powder.

Various minor changes may be in the details disclosed in the foregoing specification without departing from the spirit or scope of the invention.

Having thus disclosed the invention, what is claimed is:

1. An insecticidal composition which contains in intimate admixture, capsicum as an irritant agent, sabadilla seed as a source of toxic veratrine and methyl crotonic acid, and a member selected from the group consisting of the sulfate, carbonate and hydrate of lime as an activator, said composition being effective against Dysdercus, aphis, roaches, lice, fleas and the like.

2. The composition according to claim 1, wherein the activator is the sulfate of lime.

3. The composition according to claim 1, wherein the activator is the carbonate of lime.

4. The composition according to claim 1, wherein the activator is the hydrate of lime.

5. The composition according to claim 1, and further containing an insecticidal arsenical as a complementary toxic agent.

FRANCISCO E. BABBINI.

REFERENCES CITED

The following references are of record in the file of this patent:

UNITED STATES PATENTS

| Number | Name | Date |
|---|---|---|
| 136,203 | Baguol | Feb. 25, 1873 |
| 312,270 | Hoag | Feb. 17, 1885 |
| 1,185,603 | Peck | May 30, 1916 |
| 2,024,392 | Schotte | Dec. 17, 1935 |
| 2,159,953 | Proetto | May 23, 1939 |
| 2,348,949 | Allen et al. | May 16, 1944 |
| 2,168,064 | Faloon | Aug. 1, 1939 |